United States Patent
Custodero et al.

(10) Patent No.: US 9,550,890 B2
(45) Date of Patent: *Jan. 24, 2017

(54) RUBBER COMPOSITION COMPRISING A THERMOPLASTIC FILLER AND COMPATIBILIZER

(75) Inventors: Emmanuel Custodero, Clermont-Ferrand (FR); Damien Thomasson, Clermont-Ferrand (FR); Vincent Abad, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/806,508

(22) PCT Filed: Jun. 23, 2011

(86) PCT No.: PCT/EP2011/060583
§ 371 (c)(1),
(2), (4) Date: Jan. 18, 2013

(87) PCT Pub. No.: WO2011/161222
PCT Pub. Date: Dec. 29, 2011

(65) Prior Publication Data
US 2013/0116376 A1    May 9, 2013

(30) Foreign Application Priority Data
Jun. 23, 2010   (FR) .................................. 10 54983

(51) Int. Cl.
*C08L 9/06*    (2006.01)
*C08L 9/00*    (2006.01)
(Continued)

(52) U.S. Cl.
CPC ............... *C08L 9/06* (2013.01); *B60C 1/0016* (2013.04); *C08L 9/00* (2013.01); *C08L 21/00* (2013.01);
(Continued)

(58) Field of Classification Search
CPC ............... C08L 9/06; C08L 9/00; C08L 53/02; C08L 21/00; C08L 2666/24; C08L 2666/14; C08L 87/00; C08L 53/00; C08L 25/00; C08L 27/12; C08L 35/00; B60C 1/0016; C08K 5/06; C08K 5/026
(Continued)

(56) References Cited

U.S. PATENT DOCUMENTS 5,227,425 A * 7/1993 Rauline .......................... 524/493
5,977,238 A    11/1999 Labauze ........................ 524/492
(Continued)

FOREIGN PATENT DOCUMENTS

EP    0 117 834 A1    9/1984
EP    1 127 909 A1    8/2001
(Continued)

OTHER PUBLICATIONS

Pipich et al., "Complex phase behavior near the Lifshitz line in a ternary polymer blend," Appl. Phys. A—Mater 74(1), S345-S347 (2002).*
(Continued)

*Primary Examiner* — Aiqun Li
*Assistant Examiner* — Josephine Chang
(74) *Attorney, Agent, or Firm* — Fitzpatrick, Cella, Harper & Scinto (57) ABSTRACT

A rubber composition, which can be used for manufacturing tires, is based on one or more diene elastomers, on one or more reinforcing fillers, and on a crosslinking system. The rubber composition includes particles of one or more ther- (Continued)

moplastic materials chosen from thermoplastic materials with melting or softening points varying from 80° C. to 300° C. The rubber composition also includes one or more compatibilizing agents chosen from block copolymers that includes at least one diene elastomer block and at least one thermoplastic block compatible with the one or more thermoplastic materials.

17 Claims, 3 Drawing Sheets

(51) Int. Cl.

| | | |
|---|---|---|
| *C08L 21/00* | (2006.01) | |
| *B60C 1/00* | (2006.01) | |
| *C08K 5/06* | (2006.01) | |
| *C08L 25/00* | (2006.01) | |
| *C08L 27/12* | (2006.01) | |
| *C08L 35/00* | (2006.01) | |
| *C08L 87/00* | (2006.01) | |

(52) U.S. Cl.
CPC .............. *C08K 5/06* (2013.01); *C08L 25/00* (2013.01); *C08L 27/12* (2013.01); *C08L 35/00* (2013.01); *C08L 87/00* (2013.01)

(58) Field of Classification Search
USPC .......................................................... 524/526
See application file for complete search history.

(56) References Cited

U.S. PATENT DOCUMENTS

| | | | |
|---|---|---|---|
| 6,013,718 A | 1/2000 | Cabioch et al. ............... 524/506 |
| 6,036,800 A | 3/2000 | Covasce et al. .............. 156/123 |
| 6,503,973 B2 | 1/2003 | Robert et al. ................. 524/492 |
| 6,610,261 B1 | 8/2003 | Custodero et al. ........... 423/127 |
| 6,774,255 B1 | 8/2004 | Tardivat et al. .............. 556/427 |
| 6,815,473 B2 | 11/2004 | Robert et al. ................. 523/215 |
| 7,199,175 B2 | 4/2007 | Vasseur ......................... 524/492 |
| 7,217,751 B2 | 5/2007 | Durel et al. ................... 524/262 |
| 7,300,970 B2 | 11/2007 | Durel et al. ................... 524/493 |
| 7,312,264 B2 | 12/2007 | Gandon-Pain ................ 524/236 |
| 7,488,768 B2 | 2/2009 | Tardivat et al. .............. 524/262 |
| 7,491,767 B2 | 2/2009 | Durel et al. ................... 524/493 |
| 7,820,771 B2 | 10/2010 | Lapra et al. ................... 525/479 |
| 8,344,063 B2 | 1/2013 | Marechal et al. ............ 524/571 |
| 8,686,086 B2 * | 4/2014 | Abad et al. ................... 524/493 |
| 2002/0019484 A1 | 2/2002 | Nahmias et al. ............. 525/132 |
| 2007/0208135 A1 | 9/2007 | Gervat et al. .................. 525/88 |
| 2009/0160078 A1 | 6/2009 | Abad et al. ................ 264/178 R |
| 2009/0186961 A1 | 7/2009 | Araujo Da Silva et al. . 523/150 |
| 2009/0209709 A1 | 8/2009 | Araujo Da Silva et al. ........................ 525/333.1 |
| 2009/0234066 A1 | 9/2009 | Araujo Da Silva et al. . 524/571 |
| 2009/0270558 A1 | 10/2009 | Gandon-Pain et al. ....... 525/190 |
| 2010/0249270 A1 | 9/2010 | Robert et al. ................. 523/150 |
| 2010/0252156 A1 | 10/2010 | Robert et al. .............. 152/209.1 |
| 2012/0149822 A1 | 6/2012 | Abad et al. ................... 524/449 |
| 2012/0156400 A1 | 6/2012 | Abad et al. ..................... 428/12 |
| 2012/0180923 A1 | 7/2012 | Custodero et al. ........... 152/502 |
| 2012/0285597 A1 | 11/2012 | Abad et al. ................... 152/450 |
| 2012/0315408 A1 | 12/2012 | Chouvel et al. ................ 428/12 |

FOREIGN PATENT DOCUMENTS

| | | |
|---|---|---|
| FR | 2 740 778 A1 | 5/1997 |
| FR | 2 765 882 A1 | 1/1999 |
| WO | WO 94/24208 A1 | 10/1994 |
| WO | WO 97/36724 A2 | 10/1997 |
| WO | WO 99/16600 A1 | 4/1999 |
| WO | WO 01/92402 A1 | 12/2001 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 2004/039872 A1 | 5/2004 |
| WO | WO 2004/096865 A2 | 11/2004 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2008/141702 A1 | 11/2008 |
| WO | WO 2009/000750 A1 | 12/2008 |
| WO | WO 2009/000752 A1 | 12/2008 |
| WO | 2011/151228 A1 | 12/2011 |

OTHER PUBLICATIONS

Vranjes et al, "Compatibilization Efficiency of Styrene-Butadiene Block Copolymers as a Function of Their Block Number," J. Appl. Polym. Sci., vol. 108, No. 1, 466-472 (2008).*
U.S. Appl. No. 13/518,067, filed Dec. 21, 2010.
U.S. Appl. No. 13/640,974, filed Apr. 14, 2011.
U.S. Appl. No. 13/643,147, filed Mar. 10, 2011.
U.S. Appl. No. 13/807,365, filed Jul. 7, 2011.
U.S. Appl. No. 13/700,226, filed May 24, 2011.
U.S. Appl. No. 13/819,899, filed Aug. 9, 2011.

* cited by examiner

RUBBER COMPOSITION COMPRISING A THERMOPLASTIC FILLER AND COMPATIBILIZER

FIELD OF THE INVENTION

The present invention relates to a rubber composition which can be used in particular in the manufacture of tires or tire semifinished products, such as treads, the said composition being based on a diene elastomer, on a reinforcing filler, on particles of a specific thermoplastic material, on a compatibilizing agent and on a vulcanization system.

BACKGROUND

In the field of the manufacture of tires and in particular of the formulation of rubber compositions in contact with the ground, known as treads, the aim is generally to find the best possible compromise between conflicting performances, such as the behaviour of the vehicle, the rolling resistance, the dry and wet grip, and the wear.

In particular, it would be desirable to reduce the modulus of the materials forming the treads in order to promote grip and the indentation of the tread in the ground but, at the same time, treads of very high stiffness would be preferred for wear and road behaviour performances.

Any modification to the formulation of the treads has consequences for the compromise between these performances.

It is known that it is possible to improve the grip of tires under forceful braking conditions without modifying the hysteresis under normal rolling conditions and thus without modifying the rolling resistance of the tires concerned.

In particular, it is known that the above compromise can be improved by producing rubber compositions which result in treads having a modulus of elasticity which greatly decreases at the surface as a result of a rise in temperature. This is because such a decrease in the modulus, for example during a braking action which is always accompanied by a local increase in the temperature, makes it possible to increase the degree of effective contact of the tread with the ground, in particular rough ground, and thereby to enhance the performances related to the contact, in particular ground grip, and thus the braking capability.

This result can be obtained by introducing, into a rubber composition for the manufacture of tires based on one or more diene elastomers, on one or more reinforcing fillers and on a vulcanization system, particles of one or more thermoplastic materials.

There is known, from the document WO 2004/039872, a process for the preparation of a composition based on diene elastomer and on thermoplastic polymer chosen from amorphous polymers with a glass transition temperature of greater than 80° C. and crystalline polymers with a melting point of greater than 190° C. The process comprises a stage of premixing the thermoplastic polymer with a portion of the diene elastomer, in order to obtain a masterbatch, this premixing being carried out at a temperature equal to or greater than the glass transition temperature or equal to or greater than the melting point reduced by 20° C., and then a stage of mixing the masterbatch with the remaining portion of the diene elastomer.

However, the use of such compositions can result in a large decrease in the ultimate strength, which may be damaging in terms of wear.

BRIEF DESCRIPTION OF THE INVENTION

There thus exists a need to provide a rubber composition for the manufacture of tires, comprising particles of thermoplastic materials, in which the particles are suitably dispersed, while providing a satisfactory ultimate strength.

A subject-matter of the invention is thus a rubber composition which can be used in particular in the manufacture of tires, based on one or more diene elastomers, on one or more reinforcing fillers and on a vulcanization system, comprising particles of one or more thermoplastic materials chosen from thermoplastic materials with melting or softening points varying from 80° C. to 300° C., the said composition comprising one or more compatibilizing agents chosen from block copolymers comprising at least one first diene elastomer block and at least one second thermoplastic block compatible with the said thermoplastic material or materials.

Another subject-matter of the invention is a process for preparing a rubber composition, based on one or more diene elastomers, on one or more reinforcing fillers and on a crosslinking system, comprising particles of one or more thermoplastic materials with melting or softening points ($T_{M1}$) varying from 80 to 300° C. and one or more compatibilizing agents with melting or softening points ($T_{M2}$) chosen from block copolymers comprising at least one first diene elastomer block and at least one second thermoplastic block compatible with the thermoplastic material or materials, the said process comprising the following stages:

incorporating in the diene elastomer or elastomers, during a first "non-productive" stage, the particles of the thermoplastic material or materials and the compatibilizing agent or agents, separately or in the form of a masterbatch prepared beforehand, and the reinforcing filler or fillers, everything being kneaded thermomechanically, in one or more goes, until a maximum temperature greater than the highest of the melting or softening points ($T_{M1}$, $T_{M2}$) of the thermoplastic materials and compatibilizing agents, or greater than the melting or softening point $T_M$ of the said masterbatch, in the case where the particles of the said thermoplastic material or materials and the compatibilizing agent or agents were introduced in the form of a masterbatch, is reached, cooling the combined mixture to a temperature of less than 100° C., subsequently incorporating, during a second "productive" stage, the crosslinking system, then kneading everything up to a maximum temperature of less than 120° C.

Another subject-matter of the invention is the use of a composition according to the invention in the manufacture of a finished article or of a semifinished product intended for a motor vehicle ground-contact system, such as a tire, internal safety support for a tire, wheel, rubber spring, elastomeric joint, other suspension or anti-vibratory element. In particular, the composition according to the invention can be used in the manufacture of semifinished products made of rubber intended for tires, such as treads, crown reinforcing plies, sidewalls, carcass reinforcing plies, beads, protectors, underlayers, rubber blocks and other internal rubbers, in particular decoupling rubbers, intended to provide the bonding or the interface between the abovementioned regions of the tires.

Another subject-matter of the invention is a finished article or semifinished product intended for a motor vehicle ground-contact system, in particular tires and tire semifinished products, comprising a composition according to the invention. The tires in accordance with the invention are intended in particular for passenger vehicles as for industrial vehicles chosen from vans, "heavy-duty vehicles"—i.e., underground, bus, heavy road transport vehicles (lorries, tractors, trailers) or off-road vehicles—, heavy agricultural vehicles or earth moving equipment, planes, and other transportation or handling vehicles.

BRIEF DESCRIPTION OF THE DRAWINGS

The invention and its advantages will be easily understood in the light of the description and implementational examples which follow, as well as of FIG. 1 relating to these examples, which represents curves of variation in elastic modulus as a function of the temperature for rubber compositions, and FIGS. 2 and 3 relating to these examples, which represent curves of change in true secant modulus as a function of the elongation for these rubber compositions.

DETAILED DESCRIPTION OF EMBODIMENTS OF THE INVENTION

I. Measurements and Tests Used
Dynamic Properties

The dynamic characterizations of the elastomer materials are carried out on a viscosity analyser (VA4000 from Métravib) according to Standard ASTM D5992-96. The response of a sample of vulcanized composition (cylindrical test specimen with a thickness of 4 mm and with a cross section of 100 mm²), subjected to a simple alternating sinusoidal shear stress, at a frequency of 10 Hz, is recorded during a temperature sweep from 0° C. to 150° C. with a gradient of 5°/min, under a maximum stress of 0.7 MPa. The results made use of are the dynamic shear modulus G* and the loss factor tan δ in the given temperature range. The following equations exist:

$$G^* = \sqrt{G'^2 + G''^2} \text{ and tan } \delta = G''/G'$$

G*: dynamic shear modulus in MPa;
G': true shear modulus in MPa;
G": loss modulus in MPa; and
δ: phase shift between the imposed strain and the measured stress.

Tensile Tests

These tensile tests make it possible to determine the elasticity stresses and the properties at break. Unless otherwise indicated, they are carried out in accordance with Standard ASTM D412-98. The ASTM C test specimens with a thickness of 2.5 mm are used. The force-displacement curves are determined in first elongation up to the failure of the test specimen, at a rate of 500 mm/min, at a temperature of 23° C.±2° C. and under standard humidity conditions (50±5% relative humidity). The true secant modulus is measured as a function of the strain or elongation, that is to say, for a given elongation, the ratio of the extension stress, divided by the true cross section of the test specimen, to the elongation. The true secant modulus is expressed in MPa.

II. Conditions for the Implementation of the Invention

As explained above, the composition according to the invention is based on one or more diene elastomers, on one or more reinforcing fillers, on a vulcanization system, on specific particles of one or more thermoplastic materials and on one or more compatibilizing agents.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the vulcanization thereof.

In the present description, unless expressly indicated otherwise, all the percentages (%) are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

II-1. Diene Elastomer

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the compositions in accordance with the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinyl-aromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the above-mentioned type, such as, in particular, 1,4-hexadiene, ethylidene-norbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-buta-dienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, 2,4-hexadiene. The following, for example, are suitable as vinylaromatic compounds: styrene, ortho-, meta- or para-methylstyrene, the "vinyl toluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion, in emulsion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778, U.S. Pat. No. 6,013,718 or WO 2008/141702), of alkoxysilane groups (such as described, for example, in FR 2 765 882 or U.S. Pat. No. 5,977,238), of carboxyl groups (such as described, for example, in WO 01/92402, U.S. Pat. No. 6,815,473, WO 2004/096865 or US 2006/0089445) or of polyether groups (such as described, for example, in EP 1 127 909, U.S. Pat. No. 6,503,973, WO 2009/000750 or WO 2009/000752). Mention may also be made, as other examples of functionalized elastomers, of the elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a glass transition temperature Tg (measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between 5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the diene elastomer or elastomers of the composition according to the invention are preferably chosen from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably chosen from the group consisting of butadiene/styrene copolymers (SBRs), isoprene/butadiene copolymers (BIRs), isoprene/styrene copolymers (SIRs) and isoprene/butadiene/styrene copolymers (SBIRs), preferably butadiene/styrene copolymers.

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment, the diene elastomer is predominantly (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tires.

"Isoprene elastomer" is understood to mean, in a known way, an isoprene homopolymer or copolymer, in other words a diene elastomer chosen from the group consisting of natural rubber (NR), synthetic polyisoprenes (IRs), the various copolymers of isoprene and the mixtures of these elastomers. Mention will in particular be made, among isoprene copolymers, of isobutene/isoprene copolymers (butyl rubber—IIRs), isoprene/styrene copolymers (SIRs), isoprene/butadiene copolymers (BIRs) or isoprene/butadiene/styrene copolymers (SBIRs). This isoprene elastomer is preferably natural rubber or a synthetic cis-1,4-polyisoprene; use is preferably made, among these synthetic polyisoprenes, of the polyisoprenes having a content (mol %) of cis-1,4-bonds of greater than 90%, more preferably still of greater than 98%.

According to another specific embodiment, in particular when it is intended for a tire sidewall or for an airtight internal rubber of a tubeless tire (or other air-impermeable component), the composition in accordance with the invention can comprise at least one essentially saturated diene elastomer, in particular at least one EPDM copolymer or one butyl rubber (optionally chlorinated or brominated), whether these copolymers are used alone or as a mixture with highly unsaturated diene elastomers as mentioned above, in particular NR or IRs, BRs or SBRs.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a content (mol %) of cis-1,4-structures preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-structures of greater than 90%.

According to another specific embodiment of the invention, the rubber composition comprises, for example, from 30 to 100 phr, in particular from 50 to 100 phr, of a high Tg elastomer as a blend with from 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition according to the invention comprises a blend of a BR (as low Tg elastomer) exhibiting a content (mol %) of cis-1,4-structures of greater than 90% with one or more S-SBR(s) or E-SBR(s) (as high Tg elastomer(s)).

The composition according to the invention can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II-2. Particles of Thermoplastic Material

As explained above, the rubber composition according to the invention comprises particles of one or more thermoplastic materials. The thermoplastic material or materials are chosen from thermoplastic materials having melting or softening points varying from 80° C. to 300° C.

The melting point of a crystalline thermoplastic material is determined by differential scanning calorimetry (DSC) according to Standard ISO 1137.

It should be remembered that the softening point is the temperature at which the material, for example in the powder form, cakes. The softening point of a thermoplastic material is measured according to Standard ISO 4625 (ring-and-ball method).

The thermoplastic materials are generally chosen from poly-propylenes, polyethylenes, polystyrenes, acrylonitrile/butadiene/styrene copolymers, polyacrylates, polyamides, polyphenylene ethers, polycarbonates, polyacetals, thermoplastic polyurethanes, thermoplastic fluoropolymers and polyesters.

Preferably, the polyesters are chosen from polyethylene terephthalates, polybutylene terephthalates and polyethylene naphthoates.

The fluoropolymers can be chosen from copolymers of tetra-fluoroethylene and hexafluoropropene, copolymers of tetrafluoro-ethylene and perfluorovinyl ether, copolymers of tetrafluoroethylene and ethylene, and polyvinylidene fluoride.

The polyacrylate can be polymethyl methacrylate.

Preferably, the melting or softening point of the thermoplastic material or materials varies from 80° C. to 200° C.

Preferably, the particles exhibit a mean diameter (by volume) of less than or equal to 200 µm, preferably of less than 100 µm and better still of between 50 and 100 µm.

The volume-average size of the particles of thermoplastic material was determined with a Coulter counter.

A Coulter counter is a device intended to count particles and cells and to measure the size thereof. It is used, for example, for bacteria or for the analysis of the distribution in the size of particles in the measurement of air quality. The Coulter counter has been sold since the 1950s.

The counter detects the change in the electrical resistance when an electrolyte comprising particles or cells is passed through a small opening which can be calibrated. The cells, not themselves being conductive, for this reason generate a variation in the resistance. This variation depends on the size of each particle counted.

The particles of the said thermoplastic material or materials preferably represent less than 100 phr, preferably from 10 to 70 phr and very preferably from 20 to 40 phr.

Preferably, the particles represent at most 30%, better still at most 20%, by volume, with respect to the total volume of the composition.

The presence in the rubber composition of these particles of thermoplastic materials having a melting or softening point varying from 80° C. to 300° C. makes possible the softening of the composition during the rise in temperature, in particular in the event of braking. This makes it possible to increase the contact surface area of the tread on the ground, in particular rough ground, and thus the grip.

II-3. Compatibilizing Agent

As explained above, the composition according to the invention comprises one or more compatibilizing agents.

The compatibilizing agent or agents make it possible to bond the particles of thermoplastic materials to the diene elastomer or elastomers of the composition.

The compatibilizing agent or agents can be characterized by their melting point or their softening point.

The melting point of a crystalline thermoplastic material is determined by differential scanning calorimetry (DSC) according to Standard ISO 1137.

It should be remembered that the softening point is the temperature at which the material, for example in the powder form, cakes. The softening point of a thermoplastic material is measured according to Standard ISO 4625 (ring-and-ball method).

According to the invention, the compatibilizing agent or agents are chosen from block copolymers comprising at least one first diene elastomer block and at least one second thermoplastic block compatible with said thermoplastic material or materials.

"Compatible" constituents or materials is understood to mean two constituents such that their mixture exhibits, when characterized by differential scanning calorimetry (DSC), a single glass transition peak and not two peaks corresponding to the two glass transition peaks of the constituents.

The said first block or blocks of diene elastomer type make it possible to provide for compatibility with the diene elastomer or elastomers of the composition. In particular, the diene bonds of these first blocks make possible covulcanization with the diene elastomers of the composition.

Diene elastomer block is understood to mean a block of one or more elastomers, each resulting, at least in part (i.e., homopolymer or copolymer), from diene monomers (monomers carrying two conjugated or nonconjugated carbon-carbon double bonds).

Thus, the diene elastomer or elastomers forming the first block or blocks can be chosen from all the diene elastomers mentioned above concerning the diene elastomers included in the composition according to the invention.

In particular, the first diene elastomer block or blocks can be chosen from polybutadiene blocks, synthetic polyisoprene blocks, butadiene copolymer blocks and isoprene copolymer blocks.

Preferably, the molecular weight of the diene elastomer or elastomers forming the first block or blocks is greater than or equal to the entanglement weight.

Thermoplastic block compatible with the said thermoplastic material or materials is understood to mean a block of one or more thermoplastic materials which is compatible with the thermoplastic material or materials of the particles.

The said second block or blocks of thermoplastic type make it possible to provide compatibility with the particles of thermoplastic materials.

The said second thermoplastic block or blocks can be chosen from blocks of any thermoplastic material, such as those described concerning the particles of the composition, provided that these blocks are compatible with the thermoplastic material or materials of the particles of the composition.

Thus, the second block or blocks of thermoplastic type can be chosen from polypropyelene blocks, polyethylenes, polystyrenes, acrylonitrile/butadiene/styrene copolymers, polymethyl methacrylates, polyamides, polyphenylene ethers, polycarbonates, polyacetals, thermoplastic polyurethanes, thermoplastic fluoropolymers and polyesters.

Preferably, the weight-average molar mass of the second thermoplastic block or blocks is greater than 1500 g/mol.

According to a first embodiment, the compatibilizing agent or agents are diblock copolymers.

According to a second embodiment, the compatibilizing agent or agents are triblock copolymers comprising a first diene elastomer block and two second thermoplastic blocks.

According to a third embodiment, the composition according to the invention comprises, as compatibilizing agents, one or more compatibilizing agents which are diblock copolymers and one or more compatibilizing agents which are triblock copolymers comprising a first diene elastomer block and two second thermoplastic blocks.

The diblock copolymer or copolymers can be chosen from styrene/butadiene diblock copolymers, styrene/isoprene diblock copolymers and styrene/(random styrene/butadiene copolymer) diblock copolymers.

The triblock copolymer or copolymers can be chosen from styrene/butadiene/styrene triblock copolymers, styrene/isoprene/styrene triblock copolymers, styrene/(random styrene/butadiene copolymer)/styrene triblock copolymers and styrene/butadiene/methacrylate triblock copolymers.

Thus, for example, when the particles of thermoplastic material are polystyrene particles, the compatibilizing agent or agents can be chosen from styrene/butadiene diblock copolymers, styrene/isoprene diblock copolymers, styrene/(random styrene/butadiene copolymer) diblock copolymers, styrene/isoprene/styrene triblock copolymers, styrene/butadiene/styrene triblock copolymers and styrene/(random styrene/butadiene copolymer)/styrene triblock copolymers.

Preferably, when the particles of thermoplastic material are polystyrene particles, the compatibilizing agent or agents are chosen from styrene/butadiene diblock copolymers, styrene/isoprene diblock copolymers, styrene/butadiene/styrene triblock copolymers, styrene/isoprene/styrene triblock copolymers and their blends.

When the particles of thermoplastic material are polyphenylene ether particles, the compatibilizing agent or agents can be chosen from styrene/butadiene diblock copolymers, styrene/isoprene diblock copolymers, styrene/(random styrene/butadiene copolymer) diblock copolymers, styrene/butadiene/styrene triblock copolymers and styrene/isoprene/styrene triblock copolymers.

Preferably, when the particles of thermoplastic material are polyphenylene ether particles, the compatibilizing agent or agents are chosen from styrene/butadiene diblock copolymers, styrene/isoprene diblock copolymers, styrene/butadiene/styrene triblock copolymers, styrene/isoprene/styrene triblock copolymers and their blends.

Preferably, the sum of the volume of the particles and of the volume of the said second thermoplastic blocks compatible with the said thermoplastic material or materials is less than or equal to 45% of the total volume of the composition.

Preferably again, the particles/compatibilizing agent(s) ratio by volume is greater than or equal to 0.05.

II-4. Reinforcing Filler

Use may be made of any type of reinforcing filler known for its abilities to reinforce a rubber composition which can be used in the manufacture of tires, for example an organic filler, such as carbon black, a reinforcing inorganic filler, such as silica, or also a blend of these two types of filler, in particular a blend of carbon black and silica.

All carbon blacks, in particular the blacks conventionally used in tires ("tire-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, of the blacks of higher series (for example N660, N683 or N772). The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

"Reinforcing inorganic filler" should be understood, in the present patent application, by definition, as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible precipitated silicas ("HDSs"), for example, of the "Ultrasil 7000" and "Ultrasil 7005" silicas from Degussa, the "Zeosil" 1165 MP, 1135 MP and 1115 MP silicas from Rhodia, the "Hi-Sil EZ150G" silica from PPG, the "Zeopol" 8715, 8745 and 8755 silicas from Huber, the silicas with a high specific surface as described in Application WO 03/16837.

When the composition according to the invention is intended for tire treads having a low rolling resistance, the reinforcing inorganic filler used, in particular if it is silica, preferably has a BET surface of between 45 and 400 m²/g, more preferably of between 60 and 300 m²/g.

Preferably, the content of total reinforcing filler (carbon black and/or reinforcing inorganic filler, such as silica) is between 20 and 200 phr, more preferably between 30 and 150 phr, the optimum being, in a known way, different depending on the specific applications targeted: the level of reinforcement expected with regard to a bicycle tire, for example, is, of course, less than that required with regard to a tire capable of running at high speed in a sustained manner, for example a motorcycle tire, a tire for a passenger vehicle or a tire for a utility vehicle, such as a heavy duty vehicle.

According to a preferred embodiment of the invention, use is made of a reinforcing filler comprising between 30 and 150 phr, more preferably between 50 and 120 phr, of inorganic filler, particularly of silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (III):

$$Z-A-S_X-A-Z, \text{ in which:} \qquad (III)$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (III), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetra-sulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$) alkoxyldi($C_1$-$C_4$)alkylsilylpropyl)poly-sulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula III), such as described in Patent Applications WO 02/30939 (or U.S. Pat. No. 6,774,255) and WO 02/31041 (or US 2004/051210), or also of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr, more preferably between 3 and 8 phr.

A person skilled in the art will understand that use might be made, as filler equivalent to reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, requiring the use of a coupling agent for establishing the bond between the filler and the elastomer.

II.5 Crosslinking System

The crosslinking system proper is based on sulphur (or on a sulphur-donating agent) and on a primary crosslinking accelerator. Various known crosslinking activators or secondary accelerators, such as zinc oxide, stearic acid or equivalent compounds, or guanidine derivatives (in particular diphenylguanidine), come to be added to this base crosslinking system, being incorporated during the first non-productive phase and/or during the productive phase, as described subsequently.

The sulphur is used at a preferred content of between 0.5 and 10 phr, more preferably of between 0.5 and 5 phr and in particular between 0.5 and 3 phr, when the composition of the invention is intended, according to a preferred form of the invention, to form tire tread.

For its part, the primary crosslinking accelerator is used at a preferred content varying from 0.5 to 10 phr, more preferably from 0.5 to 5 phr.

The primary crosslinking accelerator must make possible the crosslinking of the rubber compositions in industrially acceptable times, while retaining a minimum safety time ("scorch time") during which the compositions can be shaped without risk of premature crosslinking ("scorching").

Use may be made of any compound capable of acting as accelerator for the crosslinking of diene elastomers in the presence of sulphur.

Accelerators of the thiazole type and their derivatives of formula (I):

in which $R^1$ represents a hydrogen atom, a 2-mercaptobenzo-thiazyl group of formula (II):

or a group of formula (III):

—$NR^2R^3$ (III)

in which $R^2$ and $R^3$ independently represent a hydrogen atom, a 2-mercaptobenzothiazyl group (formula (II)), a $C_1$-$C_4$ alkyl group or a $C_5$-$C_8$ cycloalkyl group, preferably comprising 6 ring members, it being possible for said ring to comprise at least one heteroatom, such as S, O or N, are suitable in particular.

Thiazole accelerators and preferred derivatives are chosen in particular from the group consisting of 2-mercaptobenzothiazole, 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBB S"), N-cyclohexyl-2-benzothiazolesulphenimide, N-tert-butyl-2-benzothiazolesulphenimide (abbreviated to "TBSI") and the mixtures of these compounds.

The crosslinking system of the composition according to the invention can also comprise one or more additional primary accelerators, in particular compounds of the family of the thiurams, zinc dithiocarbamate derivatives or thiophosphates.

II-6. Various Additives

The rubber composition according to the invention can also comprise all or a portion of the usual additives generally used in the elastomer compositions intended for the manufacture of tires, in particular of treads, such as, for example, plasticizers or extending oils, whether the latter are aromatic or nonaromatic in nature, pigments, protection agents, such as antiozone waxes (such as Cire Ozone C32 ST), chemical antiozones, antioxidants (such as 6-paraphenylenediamine), antifatigue agents, reinforcing resins, methylene acceptors (for example phenolic novolak resin) or methylene donors (for example HMT or H3M), as described, for example, in Application WO 02/10269.

Preferably, the composition according to the invention comprises, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The composition according to the invention can also comprise, in addition to the coupling agents, coupling activators, covering agents for the reinforcing inorganic filler or more generally processing aids capable, in a known way, by virtue of an improvement in the dispersion of the inorganic filler in the rubber matrix and of a lowering of the viscosity of the compositions, of improving their property of processing in the raw state, these agents being, for example, hydrolysable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

II-7. Manufacture of the Rubber Compositions

The rubber composition according to the invention is manufactured in appropriate mixers using two successive preparation phases according to a general procedure well known to a person skilled in the art: a first phase of thermomechanical working or kneading (sometimes described as "non-productive" phase) at high temperature, up to a maximum temperature which, according to the invention, is greater than the highest of the melting or softening points of the thermoplastic materials and compatibilizing agents when the thermoplastic materials and compatibilizing agents are introduced separately, or greater than the melting or softening point of the masterbatch when the thermoplastic materials and compatibilizing agents are introduced in the form of a masterbatch, followed by a second phase of mechanical working (sometimes described as "productive" phase) at a lower temperature, typically of less than 120° C., for example between 60° C. and 100° C., finishing phase during which the crosslinking or vulcanization system is incorporated.

According to a preferred embodiment of the invention, all the base constituents of the composition of the invention, with the exception of the crosslinking system, namely the reinforcing filler or fillers, the particles of the thermoplastic material or materials with a melting or softening point $T_{M1}$, the compatibilizing agent or agents with a melting or softening point $T_{M2}$, and the coupling agent, if appropriate, are intimately incorporated, by kneading, in the diene elastomer or the diene elastomers during the first "non-productive" phase, that is to say that at least these various base constituents are introduced into the mixer and that kneading is carried out thermomechanically, in one or more stages, until a maximum temperature greater than the highest of the temperatures $T_{M1}$ and $T_{M2}$ is reached. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The particles of the thermoplastic material or materials and the compatibilizing agents have to be introduced during the non-productive phase which takes place at high temperature, since it is desired that the thermoplastic particles and the compatibilizing agent melt and/or coalesce after they have been introduced into the mixer.

According to an alternative embodiment, the particles of the thermoplastic material or materials and the compatibilizing agent or agents are introduced during the first "non-productive" stage in the form of a preprepared masterbatch. In this case, the reinforcing filler or fillers, the masterbatch with a melting or softening point $T_M$, and the coupling agent, if appropriate, are intimately incorporated, by kneading, in the diene elastomer or the diene elastomers during the first "non-productive" phase, until a maximum temperature greater than the temperature $T_M$ is reached. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or of a plaque, in particular for laboratory characterization, or else extruded in the form of a rubber profiled element which can be used, for example, as a tire tread for a passenger vehicle.

III. Example of the Implementation of the Invention

III-1. Preparation of the Compositions

The procedure for the tests which follow is as follows: the diene elastomer or elastomers, the reinforcing filler or fillers, the optional coupling agent, the optional compatibilizing agent and the particles of the thermoplastic material, in the case where there is a compatibilizing agent, are introduced into an internal mixer, which is 70% filled and which has an initial vessel temperature of approximately 90° C., followed, after kneading for one to two minutes, by the various other ingredients, with the exception of the vulcanization system. Thermomechanical working (non-productive phase) is then carried out in one stage (total duration of the kneading equal to approximately 5 min), until a maximum "dropping" temperature of approximately 165° C. is reached. The mixture thus obtained is recovered and cooled, and then the vulcanization system (sulphur and thiazole compound) and the particles of thermoplastic material, in the case where there is no compatibilizing agent, are added on an external mixer (homofinisher) at 70° C., everything being mixed (productive phase) for approximately from 5 to 6 min.

The compositions thus obtained are subsequently calendered, either, on the one hand, in the form of plaques (thickness of 2 to 3 mm) or of thin sheets of rubber, for the measurement of their physical or mechanical properties, or, on the other hand, in the form of profiled elements which can be used directly, after cutting to and/or assembling at the desired dimensions, for example as semifinished products for tires, in particular as tire treads.

III-2. Characterization Tests—Results

EXAMPLE 1

The object of this example is to compare the dynamic properties of a rubber composition which can be used for the manufacture of a tire tread comprising polystyrene particles and a compatibilizing agent (composition 2) with the properties of a rubber composition not comprising a compatibilizing agent (composition 1) and of a rubber composition comprising neither polystyrene particles nor compatibilizing agent (composition 0).

The formulations of the rubber compositions are given in Table 1. The amounts are expressed as parts per 100 parts by weight of elastomer (phr).

The contents of oil and of plasticizing resin were adjusted in order to obtain substantially the same dynamic modulus G' at ambient temperature.

TABLE 1

| | | Composition 0 | Composition 1 | Composition 2 |
|---|---|---|---|---|
| IM | SBR 1 (1) | 40 | 40 | 40 |
| | SBR 2 (2) | 60 | 60 | 60 |
| | Carbon black (3) | 4 | 4 | 4 |
| | Silica (4) | 92 | 92 | 92 |
| | Antioxidant (5) | 2 | 2 | 2 |
| | Plasticizing oil (6) | 20.5 | 29 | 29 |
| | Antiozone wax (7) | 1.5 | 1.5 | 1.5 |
| | Plasticizing resin (8) | 21 | 29 | 29 |
| | Coupling agent (9) | 7.4 | 7.4 | 7.4 |
| | Stearic acid (10) | 2 | 2 | 2 |
| | DPG (11) | 1.5 | 1.5 | 1.5 |
| | Zinc oxide (12) | 2.8 | 2.8 | 2.8 |
| | Polystyrene particles (13) | | | 25 |
| | Compatibilizing agent (14) | | | 15 |
| EM | Accelerator (15) | 2.1 | 2.1 | 2.1 |
| | CTP (16) | 0.15 | 0.15 | 0.15 |
| | Sulphur | 1.4 | 1.4 | 1.4 |
| | Polystyrene particles (13) | — | 30 | — |

IM: internal mixer

EM: external mixer (1) SSBR with 40% of styrene (% by weight of styrene/all of the polymer), 24% of 1,2-polybutadiene units and 48% of trans-1,4-polybutadiene units (% of 1,2- or 1,4-units/all of the polybutadiene);

(2) SSBR with 28% of styrene, 4% of 1,2-polybutadiene units and 81% of trans-1,4-polybutadiene units (% as 1,2- or 1,4-units/all of the polybutadiene);

(3) Carbon black N234 (ASTM grade, Degussa);

(4) Silica "Zeosil 1165MP" from Rhodia, in the form of microbeads (BET and CTAB: approximately 150-160 m²/g);

(5) N-(1,3-Dimethylbutyl)-N-phenyl-paraphenylenediamine ("Santoflex 6-PPD" from Flexsys);

(6) TDAE (Treated Distillate Aromatic Extracts) oil;

(7) Mixture of macro- and microcrystalline antiozone waxes;

(8) $C_5$-type hydrocarbon resin ("Wingtack 86" from Cray Valley);

(9) TESPT ("Si69" from Degussa);

(10) Stearin ("Pristerene 4931", Uniqema);

(11) Diphenylguanidine ("Perkacit DPG" from Flexsys);

(12) Zinc oxide (industrial grade, Umicore);

(13) "Primecast 101" (EOS GmbH); Tg = 105° C., volume-average diameter: 80 μm (supplier's data);

(14) "Kraton D1118": styrene/butadiene diblock copolymer from Kraton Polymers;

(15) N-Cyclohexyl-2-benzothiazolesulphenamide ("Santocure CBS" from Flexsys);

(16) Cyclohexylthiophthalimide (PVI).

The change in the dynamic modulus G' of each composition is measured as a function of the temperature, under a stress of 0.7 MPa.

Results

Figure 1:
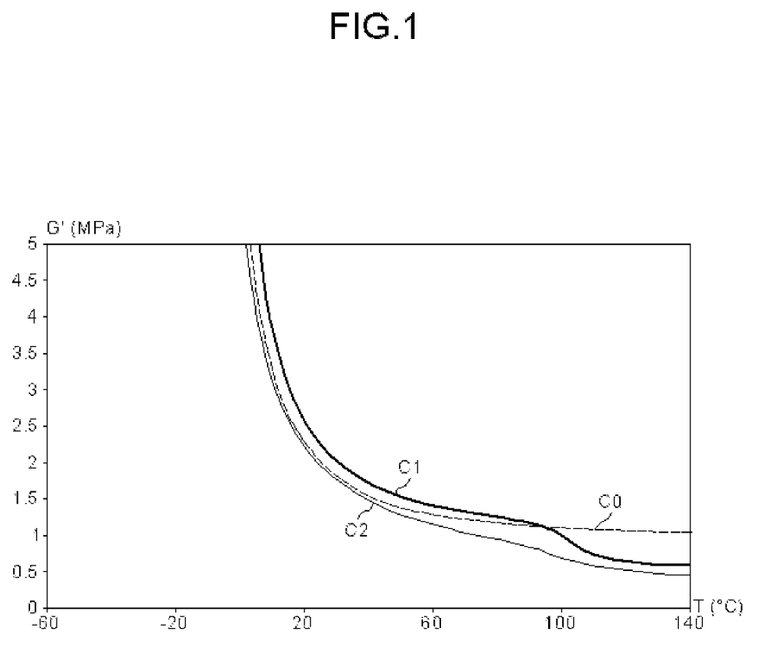
Figure 2:
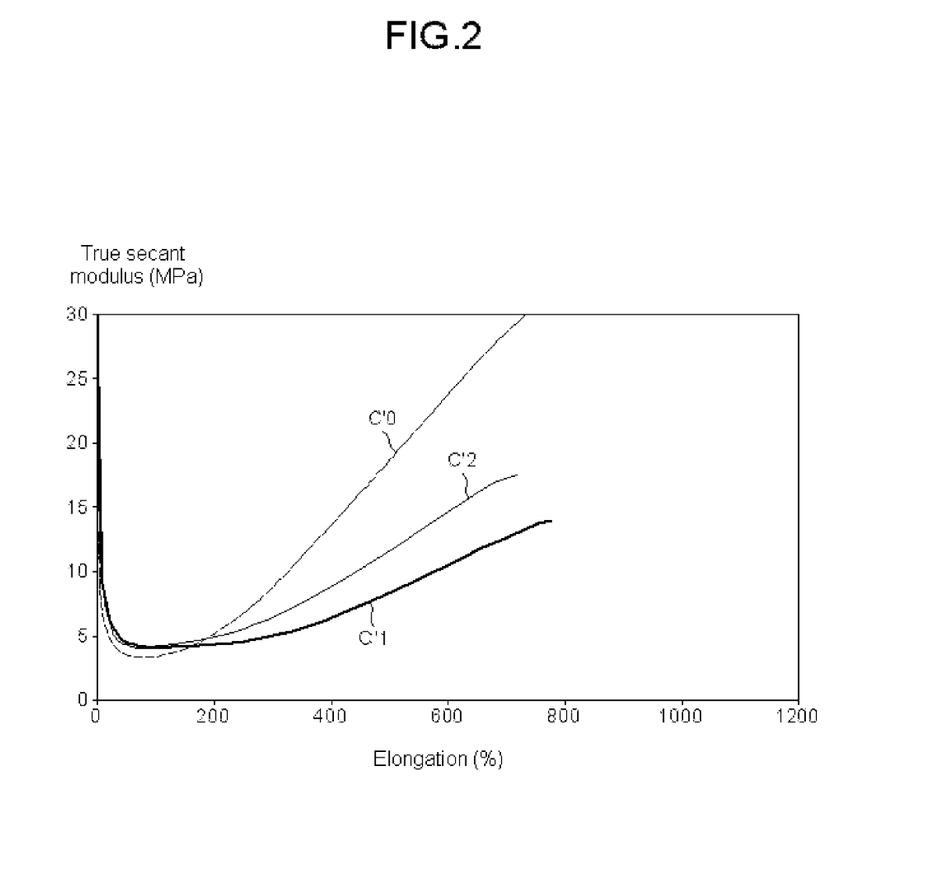

The results are given in FIGS. 1 and 2.

In FIG. 1, the curve C0 represents the variation in the dynamic modulus of composition 0, the curve C1 represents the variation in the dynamic modulus of composition 1 and the curve C2 represents the variation in the elastic modulus of composition 2 according to the invention.

A large decrease in the modulus is observed above 80° C. Thus, for example:

$(G'_{40° C.} - G'_{140° C.})/G'_{40° C.} = 31\%$ for composition 0

$(G'_{40° C.} - G'_{140° C.})/G'_{40° C.} = 64\%$ for composition 1

$(G'_{40° C.} - G'_{140° C.})/G'_{40° C.} = 68\%$ for composition 2 according to the invention.

Thus, the introduction of polystyrene particles into the rubber composition makes possible softening of the latter at high temperature.

In FIG. 2, the curve C0' represents the variation in the true secant modulus of composition 0, the curve C1' the variation in the true secant modulus of composition 1 and the curve C2' the variation in the true secant modulus of composition 2.

FIG. 2 shows that the ultimate strength of composition 2 is substantially improved with respect to that of composition 1. This reflects the fact that the compatibilizing agent improves the bonding between the particles of thermoplastic material and the diene elastomer matrix.

EXAMPLE 2

The object of this example is to compare the dynamic properties of a composition comprising polyphenylene ether particles and a compatibilizing agent prepared by the process according to the invention (mixture B) with the properties of a rubber composition with the same composition but obtained by a process other than the process according to the invention (mixture A).

The formulations of the mixtures are given in Table 1. The amounts are expressed as parts per 100 parts by weight of elastomer (phr).

TABLE 1

|  |  | Mixture A (phr) | Mixture B (phr) |
|---|---|---|---|
| BR | (1) | 68 | 68 |
| SB/SBS | (2) | 48 | 0 |
| PPE | (3) | 16 | 0 |
| PPE/SB masterbatch | (4) | 0 | 64 |
| Antioxidant | (5) | 1.3 | 1.3 |
| Stearic acid | (6) | 0.5 | 0.5 |
| ZnO | (7) | 3 | 3 |
| CBS | (8) | 1.2 | 1.2 |
| Sulphur |  | 1.4 | 1.4 |

(1) BR solution (content expressed as dry BR: 4% of 1,2-poly-butadiene units and 93% of cis-1,4-polybutadiene units (Tg = −104° C.);
(2) Grade of SB/SBS D1118 AS from Kraton;
(3) Grade of PPE (polyphenylene ether), "low weight", Noryl SA120; (Mw = 6300 g/mol and Tg = 165° C.; supplier's data);
(4) Masterbatch (produced in solution) of (2) and (3) in proportions by weight respectively of 3/1;
(5) N-(1,3-Dimethylbutyl-N-phenyl-para-phenylenediamine (Santoflex 6-PPD from Flexsys);
(6) Stearin ("Pristerene" from Uniqema);
(7) Zinc oxide (industrial grade, Umicore);
(8) N-Cyclohexyl-2-benzothiazolesulphenamide (Santocure CBS from Flexsys).

Preparation of Mixture A

The diene elastomer (1), the particles of thermoplastic material (3) and the compatibilizing agent (2) are introduced into the internal mixer, the initial vessel temperature of which is approximately 90° C. Kneading is carried out (non-productive phase) in order to rise in temperature in a uniform way (by gradual increase in the speed of the paddles).

At 100° C., the antioxidant (5) and the stearic acid (6) are introduced.

At 130° C., the zinc oxide (7) is introduced.

A rise in temperature is maintained until a "dropping" temperature of approximately 150° C. is reached, if the torque is virtually constant. This temperature is lower than the melting or softening point of the polyphenylene ether.

Small-sized unmelted materials are observed at the outlet of the internal mixer. The blend thus obtained is recovered and cooled, and then the vulcanization system (sulphur and CBS (8)) is added on an external mixer at 70° C., everything being mixed for approximately from 5 to 6 minutes.

Preparation of Mixture B

A masterbatch (4) was prepared beforehand in solution in toluene, then coagulated with ethanol and finally dried. The masterbatch was prepared in solution in a heated paddle mixer of internal mixer type according to the state of the art. This masterbatch comprises SB (2) and PPE (3) in the proportions by weight which are found in the mixture (A), namely 3 of SB per 1 of PPE.

The diene elastomer (1) and the masterbatch (4) are introduced into the internal mixer, the initial vessel temperature of which is approximately 90° C. Kneading is carried out (non-productive phase) in order to rise in temperature in a uniform way (by gradual increase in the speed of the paddles).

At 100° C., the antioxidant (5) and the stearic acid (6) are introduced.

At 130° C., the zinc oxide (7) is introduced.

The rise in temperature is maintained until a "dropping" temperature of approximately 150° C. is reached, if the torque is virtually constant. This temperature is greater than the melting or softening point of the masterbatch.

The blend thus obtained is recovered and cooled, and then the vulcanization system (sulphur and CBS (8)) is added on an external mixer at 70° C., everything being mixed for approximately from 5 to 6 minutes.

Results

Figure 3:
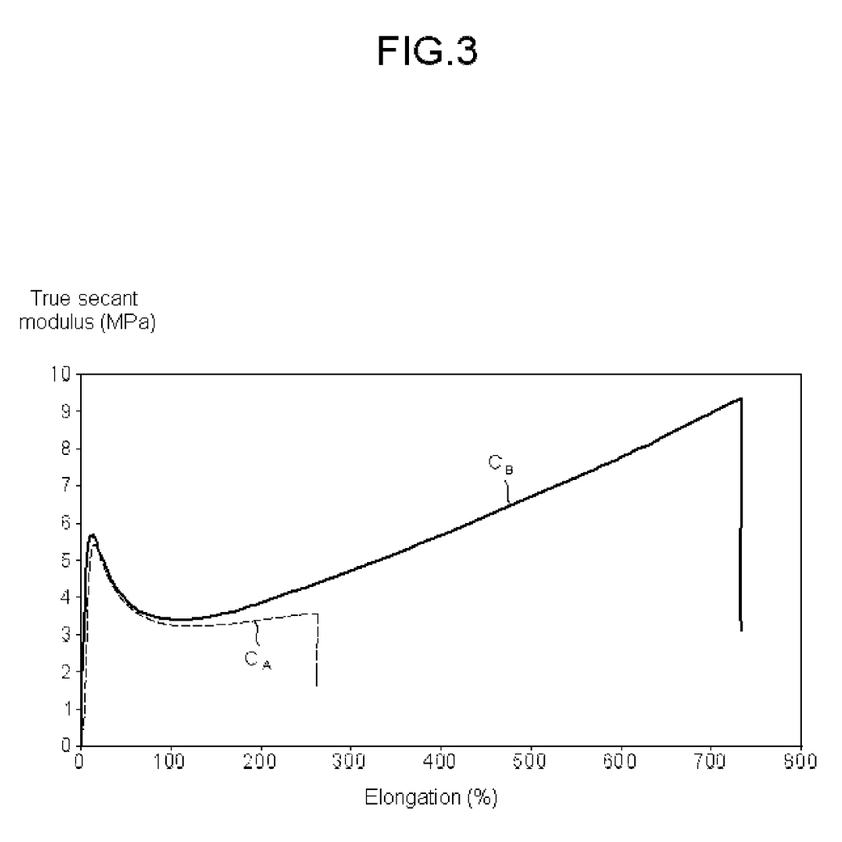

The results are given in FIG. 3, which shows that the ultimate strength of composition B is substantially improved with respect to that of composition A.

The invention claimed is:

1. A rubber composition for manufacturing tires, the rubber composition comprising:
   one or more diene elastomers;
   one or more reinforcing fillers;
   a crosslinking system;
   polystyrene particles, where the particles exhibit a volume-average diameter of less than or equal to 200 µm; and
   one or more compatibilizing agents chosen from block copolymers that include at least one diene elastomer block and at least one thermoplastic block compatible with the polystyrene particles,
      wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof.

2. The rubber composition according to claim 1, wherein the polystyrene particles exhibit a volume-average diameter of less than 100 µm.

3. The rubber composition according to claim 1, wherein the polystyrene particles exhibit a volume-average diameter of between 50 and 100 µm.

4. The rubber composition according to claim 1, wherein the polystyrene particles are present at a content of less than 100 phr.

5. The rubber composition according to claim 1, wherein the polystyrene particles are present at a content of from 10 to 70 phr.

6. The rubber composition according to claim 1, wherein the one or more diene elastomers is selected from the group consisting of polybutadienes, natural rubber, synthetic polyisoprenes, butadiene copolymers, isoprene copolymers, and mixtures thereof.

7. The rubber composition according to claim 6, wherein the one or more diene elastomers is a butadiene/styrene copolymer.

8. The rubber composition according to claim 1, wherein a sum of a volume of the particles and a volume of the at least one thermoplastic block compatible with the polystyrene particles is less than or equal to 45% of a total volume of the composition.

9. The rubber composition according to claim 1, wherein a volume ratio of the polystyrene particles to the one or more compatibilizing agents is greater than or equal to 0.05.

10. The rubber composition according to claim 1, wherein the one or more reinforcing fillers is selected from the group consisting of silica, carbon black, and mixtures thereof.

11. The rubber composition according to claim 1, wherein the one or more reinforcing fillers is or are present at a content of between 20 and 200 phr.

12. The rubber composition according to claim 1, wherein the one or more reinforcing fillers is or are present at a content of between 30 and 150 phr.

13. A finished or semifinished article for a motor vehicle ground-contact system, the finished or semifinished article comprising a rubber composition that includes:
one or more diene elastomers,
one or more reinforcing fillers,
a crosslinking system,
polystyrene particles, where the particles exhibit a volume-average diameter of less than or equal to 200 μm; and
one or more compatibilizing agents chosen from block copolymers that include at least one diene elastomer block and at least one thermoplastic block compatible with the polystyrene particles,
wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof.

14. A tire comprising a rubber composition that includes:
one or more diene elastomers,
one or more reinforcing fillers,
a crosslinking system,
polystyrene particles, where the particles exhibit a volume-average diameter of less than or equal to 200 μm; and
one or more compatibilizing agents chosen from block copolymers that include at least one diene elastomer block and at least one thermoplastic block compatible with the polystyrene particles,
wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof.

15. A process for manufacturing an article for a motor vehicle ground-contact system, the process comprising:
obtaining a rubber composition that includes:
one or more diene elastomers,
one or more reinforcing fillers,
a crosslinking system,
polystyrene particles, where the particles exhibit a volume-average diameter of less than or equal to 200 μm; and
one or more compatibilizing agents chosen from block copolymers that include at least one diene elastomer block and at least one thermoplastic block compatible with the polystyrene particles,
wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof; and
using the rubber composition to produce a finished or semifinished article for the motor vehicle ground-contact system.

16. A process for manufacturing a rubber composition that includes one or more diene elastomers, one or more reinforcing fillers, a crosslinking system, polystyrene particles with melting point $T_{M1}$, where the particles exhibit a volume-average diameter of less than or equal to 200 μm and one or more compatibilizing agents with melting or softening points $T_{M2}$ chosen from block copolymers that include at least one diene elastomer block and at least one thermoplastic block compatible with the polystyrene particles, the process comprising steps of:
incorporating in the one or more diene elastomer, during a non-productive stage, the polystyrene particles, the one or more compatibilizing agents, and the one or more reinforcing fillers to form a mixture, the mixture being thermomechanically kneaded until a maximum temperature greater than a higher of $T_{M1}$ and $T_{M2}$,
cooling the mixture to a temperature of less than 100° C.;
subsequently incorporating, during a productive stage, the crosslinking system to form a final mixture; and
subsequently kneading the final mixture to a maximum temperature of less than 120° C.,
wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof.

17. A process for manufacturing a rubber composition that includes one or more diene elastomers, one or more reinforcing fillers, a crosslinking system, polystyrene particles with melting point $T_{M1}$, where the particles exhibit a volume-average diameter of less than or equal to 200 μm and one or more compatibilizing agents with melting or softening points $T_{M2}$ chosen from block copolymers that include at least one diene elastomer block and at least one thermoplastic block compatible with the polystyrene particles, the process comprising steps of:
forming a masterbatch including the polystyrene particles and the one or more compatibilizing agents;
incorporating in the one or more diene elastomer, during a non-productive stage, the masterbatch and the one or more reinforcing fillers to form a mixture, the mixture being thermo-mechanically kneaded until a maximum temperature greater than a melting or softening point $T_M$ of the masterbatch;
cooling the mixture to a temperature of less than 100° C.;
subsequently incorporating, during a productive stage, the crosslinking system to form a final mixture; and
subsequently kneading the final mixture to a maximum temperature of less than 120° C.,
wherein the one or more compatibilizing agents is selected from the group consisting of styrene/butadiene diblock copolymers, styrene/isoprene diblock copolymers, styrene/butadiene/styrene triblock copolymers, styrene/isoprene/styrene triblock copolymers, and blends thereof.

* * * * *